(12) United States Patent
Trachtman (10) Patent No.: US 9,817,585 B1
(45) Date of Patent: Nov. 14, 2017

(54) DATA RETRIEVAL SYSTEM AND METHOD

(71) Applicant: EMC Corporation, Hopkinton, MA (US)

(72) Inventor: Michael Trachtman, Arlington, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 2 days.

(21) Appl. No.: 14/952,505

(22) Filed: Nov. 25, 2015

Related U.S. Application Data (63) Continuation-in-part of application No. 14/871,936, filed on Sep. 30, 2015, now abandoned.

(51) Int. Cl.
*G06F 12/00* (2006.01)
*G06F 3/06* (2006.01)

(52) U.S. Cl.
CPC ............ *G06F 3/0611* (2013.01); *G06F 3/065* (2013.01); *G06F 3/0619* (2013.01); *G06F 3/0685* (2013.01); *G06F 3/0647* (2013.01)

(58) Field of Classification Search
None
See application file for complete search history.

(56) References Cited

U.S. PATENT DOCUMENTS

| | | | |
|---|---|---|---|
| 2013/0205065 A1* | 8/2013 | Kloeppner | G06F 12/0868 711/103 |
| 2013/0212317 A1* | 8/2013 | Traister | G06F 12/0871 711/103 |
| 2014/0136766 A1* | 5/2014 | Smith | G06F 3/0626 711/103 |
| 2015/0309729 A1* | 10/2015 | Vaid | G06F 12/0871 711/103 |

* cited by examiner

*Primary Examiner* — Brian Peugh
(74) *Attorney, Agent, or Firm* — Brian J. Colandreo; Mark H. Whittenberger; Holland & Knight LLP (57) ABSTRACT

A method, computer program product, and computing system for identifying a data portion having temporally-variable utilization. A utilization schedule is defined for the data portion, wherein the utilization schedule defines at least one high-utilization temporal period and at least one low-utilization temporal period. The data portion is accessed through a higher-performance storage system during the high-utilization temporal period. The data portion is accessed through a lower-performance storage system during the low-utilization temporal period.

21 Claims, 4 Drawing Sheets

DATA RETRIEVAL SYSTEM AND METHOD

RELATED APPLICATION

This application is a Continuation-in-Part of and claims priority to U.S. application Ser. No. 14/871,936, filed 30 Sep. 2015, now abandoned, the entire contents of which are herein incorporated by reference.

TECHNICAL FIELD

This disclosure relates to storage systems and, more particularly, to systems and methods for retrieving data.

BACKGROUND

Storing and safeguarding electronic content is of paramount importance in modern business. Accordingly, various methodologies may be employed to protect such electronic content. One such methodology is to use multiple storage systems that have differing levels of performance. For example, systems that tend to have a lower performance level tend to be less expensive on a per gigabyte level. Conversely, systems that have a higher level of performance tend to be more expensive on a per gigabyte level. Accordingly, users are often required to choose between a more expensive, higher level of performance and a less expensive, lower level of performance.

SUMMARY OF DISCLOSURE

In one implementation, a computer-implemented method includes identifying a data portion having temporally-variable utilization. A utilization schedule is defined for the data portion, wherein the utilization schedule defines at least one high-utilization temporal period and at least one low-utilization temporal period. The data portion is accessed through a higher-performance storage system during the high-utilization temporal period. The data portion is accessed through a lower-performance storage system during the low-utilization temporal period.

One or more of the following features may be included. The higher-performance storage system may include one or more solid state disks. The lower-performance storage system may include one or more hard disk drives. Accessing the data portion through a lower-performance storage system during the low-utilization temporal period may include: executing read operations on the data portion located on the lower-performance storage system; and executing synchronous write operations on the data portion located on the lower-performance storage system. Accessing the data portion through a lower-performance storage system during the low-utilization temporal period may include: copying the data portion from the lower-performance storage system to the higher-performance storage system prior to the high-utilization temporal period, thus defining a copied portion. Accessing the data portion through a higher-performance storage system during the high-utilization temporal period may further include: executing read operations on the copied portion located on the higher-performance storage system; executing synchronous write operations on the copied portion located on the higher-performance storage system; and executing asynchronous write operations on the data portion located on the lower-performance storage system. Accessing the data portion through a lower-performance storage system during the low-utilization temporal period may further include: removing the copied portion from the higher-performance storage system after expiry of the high-utilization temporal period and after completion of the asynchronous write operations executed on the data portion located on the lower-performance storage system.

In another implementation, a computer program product resides on a computer readable medium and has a plurality of instructions stored on it. When executed by a processor, the instructions cause the processor to perform operations including identifying a data portion having temporally-variable utilization. A utilization schedule is defined for the data portion, wherein the utilization schedule defines at least one high-utilization temporal period and at least one low-utilization temporal period. The data portion is accessed through a higher-performance storage system during the high-utilization temporal period. The data portion is accessed through a lower-performance storage system during the low-utilization temporal period.

One or more of the following features may be included. The higher-performance storage system may include one or more solid state disks. The lower-performance storage system may include one or more hard disk drives. Accessing the data portion through a lower-performance storage system during the low-utilization temporal period may include: executing read operations on the data portion located on the lower-performance storage system; and executing synchronous write operations on the data portion located on the lower-performance storage system. Accessing the data portion through a lower-performance storage system during the low-utilization temporal period may include: copying the data portion from the lower-performance storage system to the higher-performance storage system prior to the high-utilization temporal period, thus defining a copied portion. Accessing the data portion through a higher-performance storage system during the high-utilization temporal period may further include: executing read operations on the copied portion located on the higher-performance storage system; executing synchronous write operations on the copied portion located on the higher-performance storage system; and executing asynchronous write operations on the data portion located on the lower-performance storage system. Accessing the data portion through a lower-performance storage system during the low-utilization temporal period may further include: removing the copied portion from the higher-performance storage system after expiry of the high-utilization temporal period and after completion of the asynchronous write operations executed on the data portion located on the lower-performance storage system.

In another implementation, a computing system including a processor and memory is configured to perform operations including identifying a data portion having temporally-variable utilization. A utilization schedule is defined for the data portion, wherein the utilization schedule defines at least one high-utilization temporal period and at least one low-utilization temporal period. The data portion is accessed through a higher-performance storage system during the high-utilization temporal period. The data portion is accessed through a lower-performance storage system during the low-utilization temporal period.

One or more of the following features may be included. The higher-performance storage system may include one or more solid state disks. The lower-performance storage system may include one or more hard disk drives. Accessing the data portion through a lower-performance storage system during the low-utilization temporal period may include: executing read operations on the data portion located on the lower-performance storage system; and executing synchronous write operations on the data portion located on the lower-performance storage system. Accessing the data portion through a lower-performance storage system during the low-utilization temporal period may include: copying the data portion from the lower-performance storage system to the higher-performance storage system prior to the high-utilization temporal period, thus defining a copied portion. Accessing the data portion through a higher-performance storage system during the high-utilization temporal period may further include: executing read operations on the copied portion located on the higher-performance storage system; executing synchronous write operations on the copied portion located on the higher-performance storage system; and executing asynchronous write operations on the data portion located on the lower-performance storage system. Accessing the data portion through a lower-performance storage system during the low-utilization temporal period may further include: removing the copied portion from the higher-performance storage system after expiry of the high-utilization temporal period and after completion of the asynchronous write operations executed on the data portion located on the lower-performance storage system.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
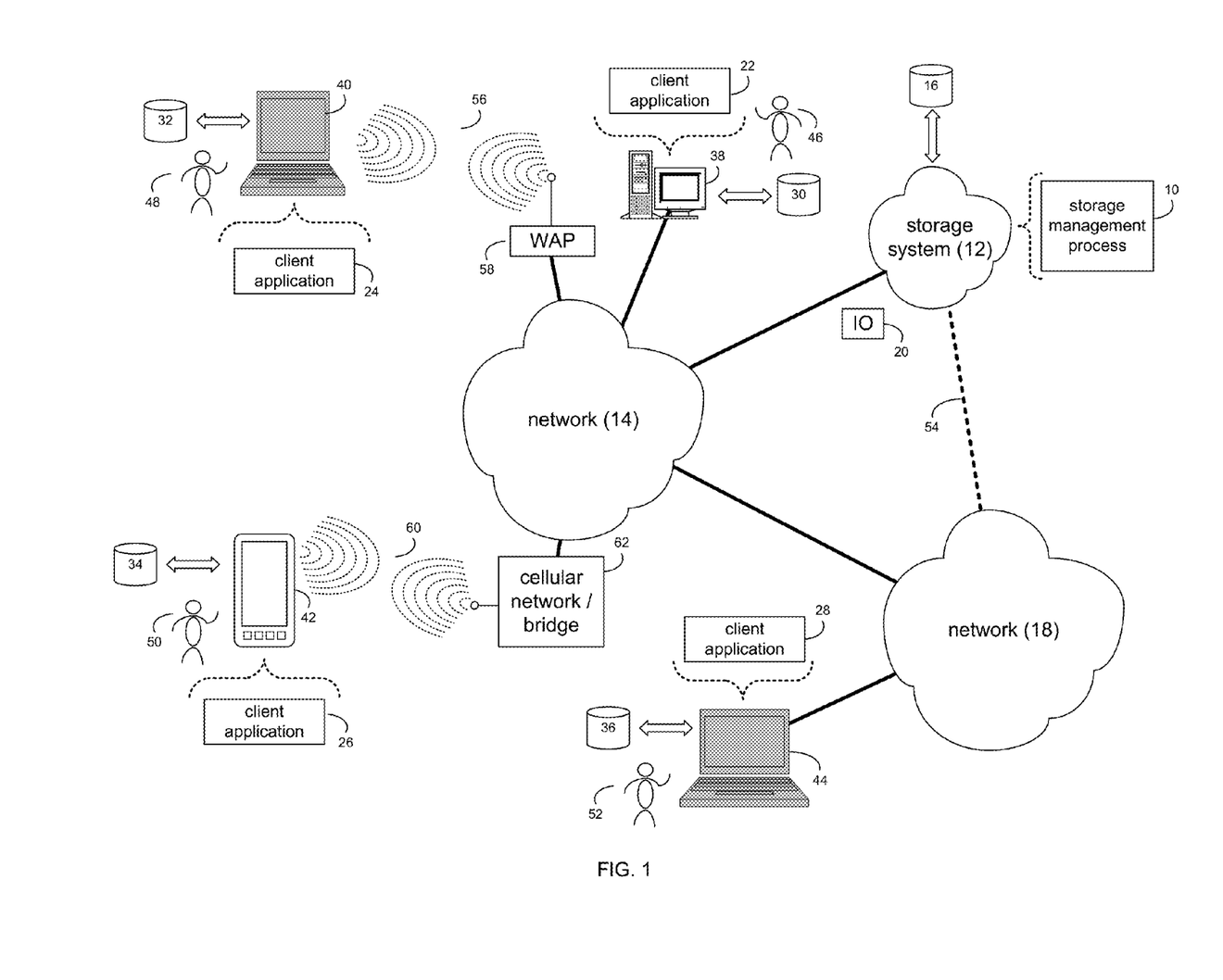
FIG. 1 is a diagrammatic view of a storage system and a storage management process coupled to a distributed computing network.

System Overview:

Referring to FIG. 1, there is shown storage management process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As used in the following disclosure, storage management process 10 may be configured to be executed/run (in whole or in part) on one or more systems other than the storage system (e.g., storage system 12) itself. For example, one or more schedulers (not shown) as well as one or more statistical analyzers (not shown) may be interfaced with, include within, or a portion of storage management process 10. Accordingly, such schedulers (not shown) and such statistical analyzers (not shown) may be executed on separate devices/systems that are not included within (or a portion of) storage system 12.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft Windows 2003 Server™; Redhat Linux™, Unix, or a custom operating system, for example.

The instruction sets and subroutines of storage management process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (i.e. a request that content be written to storage system 12) and data read requests (i.e. a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft Windows™, Apple Macintosh™, Redhat Linux™, or a custom operating system.

For illustrative purposes, storage system 12 will be described as being a network-based storage system that includes a plurality of electro-mechanical backend storage devices. However, this is for illustrative purposes only and is not intended to be a limitation of this disclosure, as other configurations are possible and are considered to be within the scope of this disclosure. For example, storage system 12 may be fully or partially virtualized, such that storage system 12 may utilize storage space (and/or storage devices) that reside in (or are coupled to) other physical systems. Examples of such systems may include but are not limited to the VPLEX™ systems and ScaleIO™ systems available from EMC™ of Hopkinton, Mass.

Figure 2:
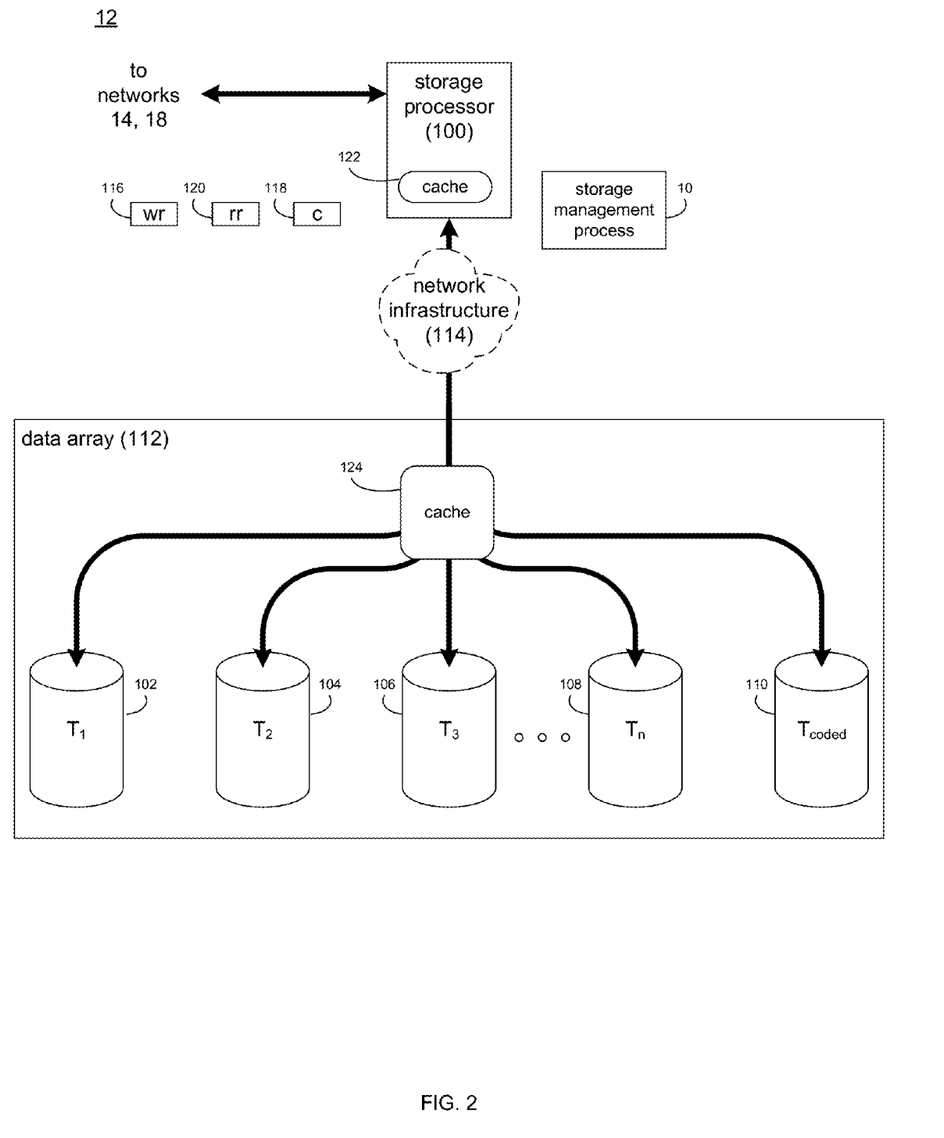
FIG. 2 is a diagrammatic view of the storage system of FIG. 1.

Referring also to FIG. 2, storage system 12 may include storage processor 100 and a plurality of storage targets T 1-n (e.g. storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for illustrative purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for illustrative purposes only and is not intended to be a limitation of this disclosure. Specifically, the actual number of storage targets may be increased or decreased depending upon e.g. the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array. As is known in the art and in some RAID configurations (e.g., RAID 6), all of the data present on the array may be coded. Therefore, the data may not exist on the array in a non-coded fashion.

While in this particular example, storage system 12 is shown to include one coded target (e.g., coded target 110), this is for illustrative purposes only and is not intended to be a limitation of this disclosure. Specifically, the actual number of coded targets may be increased or decreased depending upon e.g. the level of redundancy/performance/capacity required.

Examples of storage targets 102, 104, 106, 108 and coded target 110 may include one or more electro-mechanical hard disk drives and/or solid-state/flash devices, wherein a combination of storage targets 102, 104, 106, 108 and coded target 110 and processing/control systems (not shown) may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108 and/or coded target 110 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108 and/or coded target 110 may be a RAID device and/or computer-based hard disk drives. Further still, one or more of storage targets 102, 104, 106, 108 and/or coded target 110 may be a SAN.

In the event that storage system 12 is configured as a SAN, the various components of storage system 12 (e.g. storage processor 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of storage management process 10. The instruction sets and subroutines of storage management process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices. As discussed above, storage management process 10 may be configured to be executed/run (in whole or in part) on one or more systems other than the storage system (e.g., storage system 12) itself.

As discussed above, various IO requests (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (i.e. a request that content 118 be written to storage system 12) and data read request 120 (i.e. a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

Storage processor 100 may initially store content 118 within frontend cache memory system 122. Depending upon the manner in which frontend cache memory system 122 is configured, storage processor 100 may immediately write content 118 to data array 112 (if frontend cache memory system 122 is configured as a write-through cache) or may subsequently write content 118 to data array 112 (if frontend cache memory system 122 is configured as a write-back cache).

Data array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system). During operation of data array 112, content 118 to be written to data array 112 may be received from storage processor 100. Data array 112 may initially store content 118 within backend cache memory system 124 prior to being stored on e.g. one or more of storage targets 102, 104, 106, 108, and coded target 110.

As discussed above, the instruction sets and subroutines of storage management process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of storage management process 10 may be executed by one or more processors (not shown) and one or more memory architectures (not shown) included within data array 112.

The Storage Management Process:

As discussed above, storage targets 102, 104, 106, 108 and coded target 110 may include one or more electro-mechanical hard disk drives and/or solid-state/flash devices, wherein a combination of storage targets 102, 104, 106, 108 and coded target 110 and processing/control systems (not shown) may form data array 112.

As is known in the art, electro-mechanical hard disk drives (e.g., 15 k, 10 k and 7.2 k hard disk drives) may provide a lower level of performance at a lower price point, while solid-state/flash devices (e.g., SSDs) may provide a higher level of performance at a higher price point.

Figure 3:
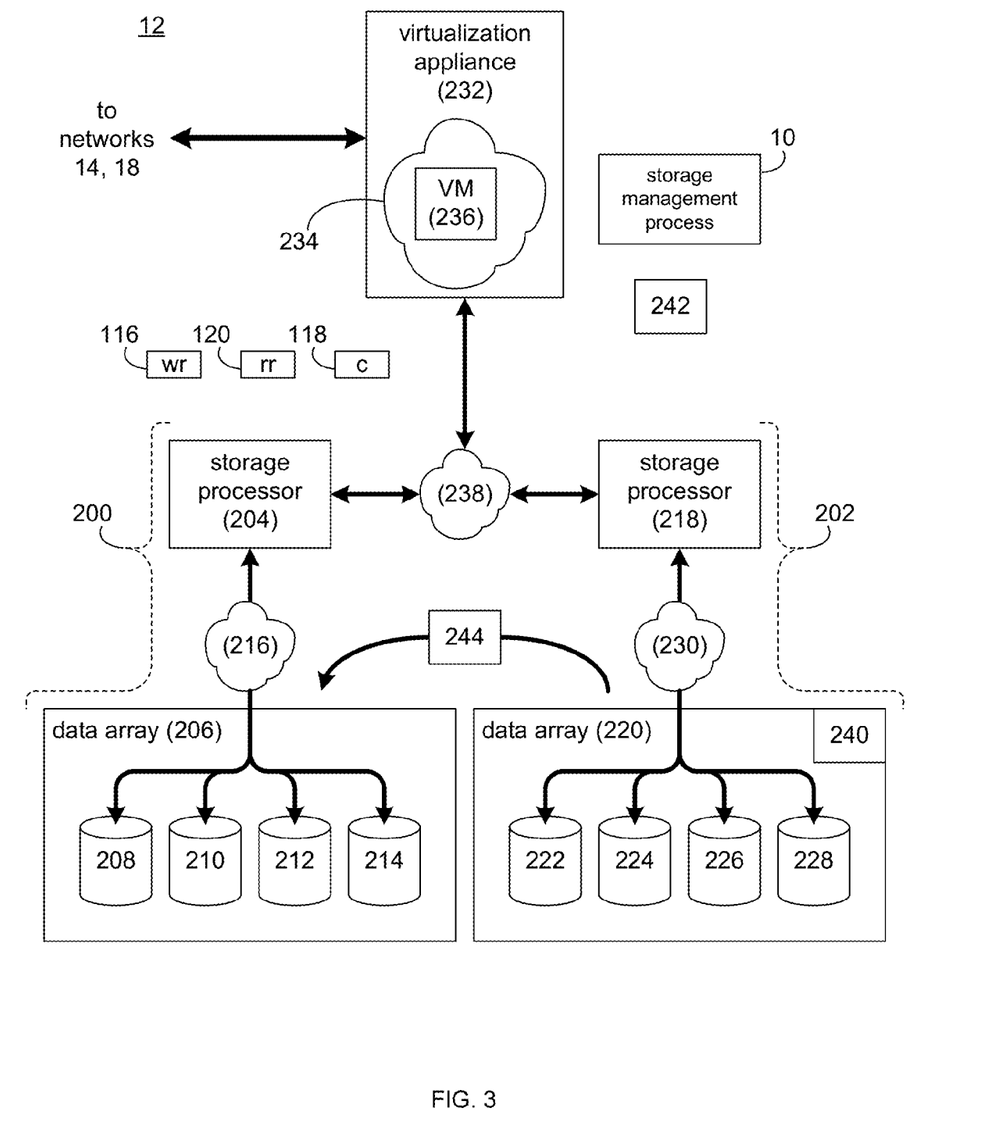
FIG. 3 is a diagrammatic view of another embodiment of the storage system of FIG. 1.

Referring also to FIG. 3, there is shown another implementation of storage system 12 that includes two separate and distinct storage subsystems (e.g., subsystems 200, 202). For illustrative purposes only, the first subsystem (e.g., subsystem 200) is shown to include a first storage processor (e.g., storage processor 204) coupled to a first data array (e.g., data array 206) that includes higher-performance/higher-cost SSDs (e.g., SSDs 208, 210, 212, 214), which may be coupled using network infrastructure 216, examples of which may include but are not limited to an Ethernet (e.g., Layer 2 or Layer 3) network, a fiber channel network, an InfiniBand network, or any other circuit switched/packet switched network. An example of subsystem 200 may include but is not limited to an XtremIO™ system available from EMC™ of Hopkinton, Mass.

Further and for illustrative purposes only, the second subsystem (e.g., subsystem 202) is shown to include a second storage processor (e.g., storage processor 218) coupled to a second data array (e.g., data array 220) that includes lower-performance/lower-cost hard disk drives (e.g., storage targets 222, 224, 226, 228), which may be coupled using network infrastructure 230, examples of which may include but are not limited to an Ethernet (e.g., Layer 2 or Layer 3) network, a fiber channel network, an InfiniBand network, or any other circuit switched/packet switched network. An example of subsystem 202 may include but is not limited to a Symmetrix VMax™ system available from EMC™ of Hopkinton, Mass.

Storage system 12 may further include a virtualization appliance (e.g., virtualization system 232) that may allow for seamless access to one or both of subsystems 200, 202. Specifically, virtualization system 232 may execute virtual machine operating environment 234. An example of virtual machine operating environment 234 may include but is not limited to a hypervisor, which is an instantiation of an operating system that may allow for one or more virtual machines (e.g., virtual machine 236) to operate within a single physical device. Accordingly, the combination of virtualization system 232, virtual machine operating environment 234, and virtual machine 236 may allow one or more users to access the resources of subsystems 200, 202. Virtualization system 232, subsystem 200 and subsystem 202 may be coupled using network infrastructure 238, examples of which may include but are not limited to an Ethernet (e.g., Layer 2 or Layer 3) network, a fiber channel network, an InfiniBand network, or any other circuit switched/packet switched network. Accordingly, some or all of storage system 12 may be virtualized via e.g., a VPLEX™ system offered by EMC™ of Hopkinton, Mass.

For the following example, assume that data 240 is currently stored on data array 220 of subsystem 202. As discussed above, data array 220 (in this example) includes lower-performance/lower-cost hard disk drives (e.g., storage targets 222, 224, 226, 228). Assume further that at certain times of the month (e.g., during the end-of-month reporting cycle), the performance provided by data array 220 and storage targets 222, 224, 226, 228 may not be sufficient to provide the higher level of performance needed during the end-of-month reporting cycle. For example, if data 240 is a database that is used to generate e.g., end-of-month compliance reports, in the event that the performance provided by data array 220 and storage targets 222, 224, 226, 228 is insufficient, the generation of these end-of-month compliance reports may be delayed (which may have one or more adverse ramifications)

Accordingly and to provide the level of performance needed at the appropriate time, storage management process 10 may be configured to locate data (e.g., data 240) on the higher performance subsystem (e.g., subsystem 200) at times when the higher level of performance is needed (e.g., during the end-of-month reporting cycle) and locate data (e.g., data 240) on the lower performance subsystem (e.g., subsystem 202) at times when the lower level of performance is acceptable (e.g., outside of the end-of-month reporting cycle).

Figure 4:
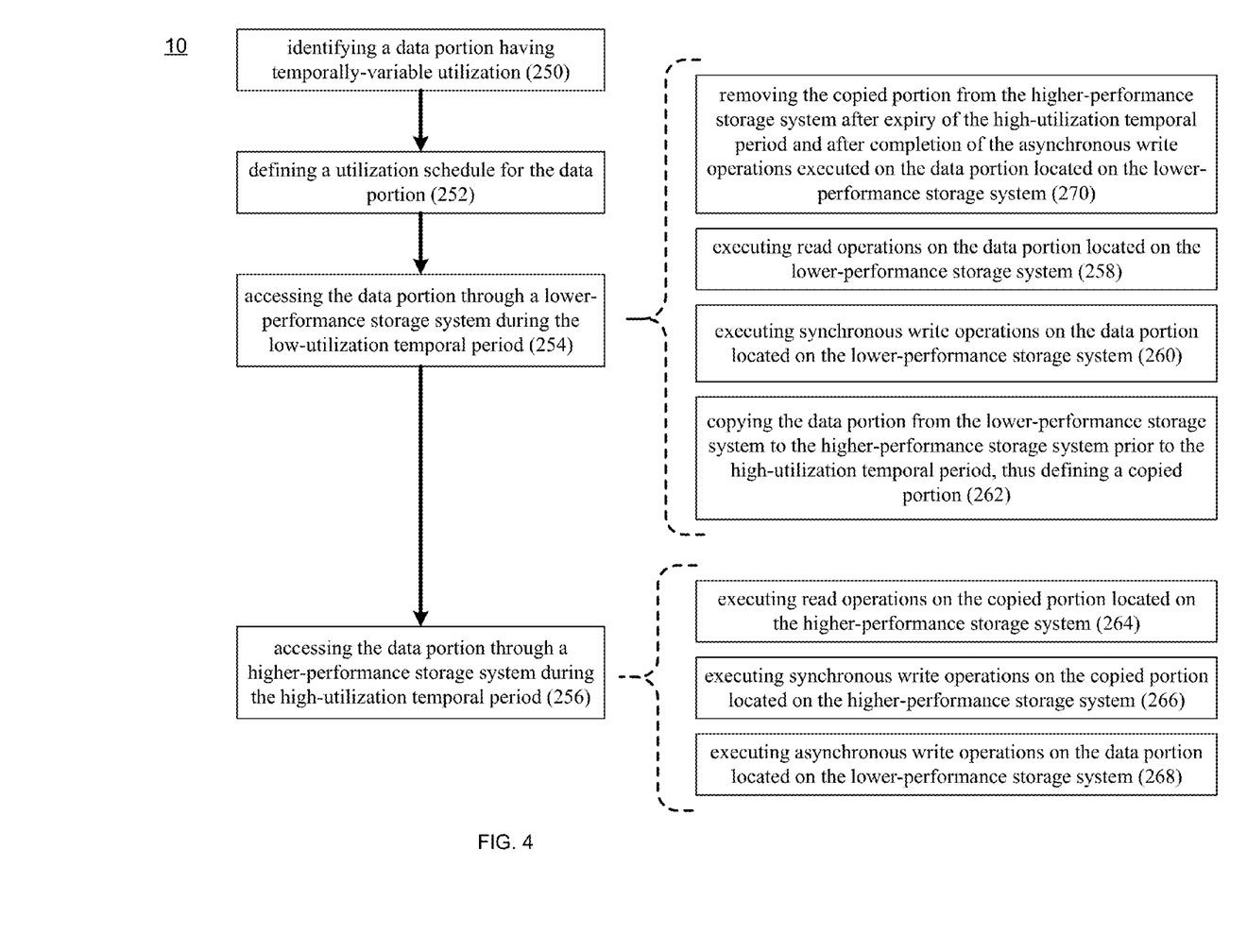
FIG. 4 is a flow chart of the storage management process of FIG. 1.

Referring also to FIG. 4 and continuing with the above-stated example, assume that a user (e.g., an administrator of storage system 12; not shown) utilizes storage management process 10 to identify 250 a data portion (e.g., data portion 240) having temporally-variable utilization. Specifically, assume that during the first three days of every month, data portion 240 is utilized to generate the above-described, end-of-month compliance reports.

Accordingly, the user (e.g., the above-described administrator of storage system 12; not shown) may define 252 (via storage management process 10) a utilization schedule (e.g., utilization schedule 242) for data portion 240. Utilization schedule 242 may define at least one high-utilization temporal period (e.g., a period of time in which data portion 240 is utilized at a high level) and at least one low-utilization temporal period (e.g., a period of time in which data portion 240 is utilized at a low level). For this example, assume that the high-utilization period is from the $1^{st}$ through the $3^{rd}$ of every month and the low-utilization period is from the $4^{th}$ through the last day of every month.

While the following example concerns a storage system in which there are two performance tiers (i.e., a low performance tier and a high performance tier), this is for illustrative purposes only and is not intended to be a limitation of this disclosure, as other configurations are possible and are considered to be within the scope of this disclosure. For example, one or more intermediate-performance tiers may be defined, such as a storage system that includes an SSD-based high performance tier, a 10,000 rpm SATA drive based mid-performance tier, and a 7,200 rpm SATA drive based low-performance tier.

While the above-stated example concerns utilization schedule 242 being defined by a human being (e.g., the administrator of storage system 12), this is for illustrative purposes only and is not intended to be a limitation of this disclosure, as other configuration are possible and are considered to be within the scope of this disclosure. Examples of such alternative configurations may include but are not limited to:

A configuration in which the software/application that requires the higher performance periods (e.g., the database discussed above) self-describes and defines its requirements for begin-times and end-times. For example, some end of month software/application may (when appropriately provisioned) declare to storage management process 10 that "it will want/need high performance" during the first three days of every month.

A configuration in which the software/application that requires the higher performance periods (e.g., the database discussed above) provides notice when it no longer needs such high performance access, thus signifying its end-time. For example, in January it may take thirty hours to complete the running of the above-described reports, while in February it may only take twenty-eight hours (e.g., due to the month being shorter and/or having less data to process). In such a configuration, the software/application may notify storage management process 10 when it no longer needs high performance access. If multiple pieces of software/applications claimed use of the data to which high-performance access is required, then upon the last piece of software/application completing their processing of the data, that last piece of software/application may notify storage management process 10 that high performance access to the data is no longer needed.

A configuration in which storage management process 10 monitors JO request levels within storage system 12 and, upon noticing that JO levels have been reduced from a high point, storage management process 10 may be configured to interpret this as high performance access to the data no longer being needed. For example if the software/application that requires the higher performance periods (e.g., the database discussed above) runs for some period of time and then is relatively quiescent for 12 hours, this may be interpreted by storage management process 10 as signifying that high performance access to the data is no longer required.

When determining/monitoring the level of JO requests received, storage management process 10 may:

Monitor the number of actual JO requests (read requests or write requests) that were sent by the device to storage system 12.

Monitor the quantity of data that was involved with the JO request. For example, are the JO requests asking four kilobytes of data at a time or megabytes of data at a time? Month end reporting procedures may have JO requests for larger blocks of data (megabytes at a time). Thus, the number of actual requests may stay the same (or even lower), but the total number of requested bytes may be much higher.

Determine other attributes of the JO request, such as the read request/write request ratio for the data being accessed, or whether the data being accessed is sequential or random.

As will be discussed below in greater detail, once utilization schedule 242 is defined 252, storage management process 10: a) may access 254 data portion 240 through a lower-performance storage system (e.g., subsystem 202) during the low-utilization temporal period (e.g., the $4^{th}$ through the last day of every month); and b) may access 256 data portion 240 through a higher-performance storage system (e.g., subsystem 200) during the high-utilization temporal period (e.g., the $1^{st}$ through the $3^{rd}$ of every month).

As discussed above, the higher-performance storage system (e.g., subsystem 200) may include one or more solid state disks and the lower-performance storage system (e.g., subsystem 202) may include one or more hard disk drives.

Continuing with the above-stated example, let's begin in the middle of the month, a time during the low-utilization temporal period (e.g., the $4^{th}$ through the last day of every month) that is sufficiently after the last high-utilization temporal period (e.g., the $1^{st}$ through the $3^{rd}$ of this month) and sufficiently before the next high-utilization temporal period (e.g., the $1^{st}$ through the $3^{rd}$ of next month).

Low Utilization Period

When accessing 254 data portion 240 through the lower-performance storage system (e.g., subsystem 202) during the low-utilization temporal period (e.g., the $4^{th}$ through the last day of every month), storage management process 10 may:

execute 258 read operations on data portion 240 located on the lower-performance storage system (e.g., subsystem 202); and execute 260 synchronous write operations on data portion 240 located on the lower-performance storage system.

Since this is during the low-utilization temporal period (e.g., the $4^{th}$ through the last day of every month), IO requests received concerning data portion 240 should be at a low level. Accordingly, the lower-performance storage system (e.g., subsystem 202) should provide an acceptable level of performance.

Therefore, storage management process 10 may execute 258 read operations (e.g., in response to read request 120) on data portion 240 located on the lower-performance storage system (e.g., subsystem 202) and these read operations should be fulfilled on a timely basis.

Further, storage management process 10 may execute 260 synchronous write operations (e.g., in response to write request 116) on data portion 240 located on the lower-performance storage system (e.g., subsystem 202) and these write operations should also be fulfilled on a timely basis.

Specifically, synchronous write operations require that a write acknowledgement be received from (in this example) data array 220 prior to an acknowledgement being provided to the device making write request 116. As stated above, since this is during the low-utilization temporal period (e.g., the $4^{th}$ through the last day of every month), the quantity of JO requests received concerning data portion 240 should be low. Accordingly, the lower-performance storage system (e.g., subsystem 202) should provide an acceptable level of performance when processing write requests in a synchronous fashion.

Transitioning from Low to High

When accessing data portion 240 through the lower-performance storage system (e.g., subsystem 202) during the low-utilization temporal period (e.g., the $4^{th}$ through the last day of every month), storage management process 10 may copy 262 data portion 240 from the lower-performance storage system (e.g., subsystem 202) to the higher-performance storage system (e.g., subsystem 200) prior to the high-utilization temporal period (e.g., the 1$^{st}$ through the 3$^{rd}$ of every month), thus resulting in the generation of copied portion 244.

Specifically and at some point just prior to the end of the low-utilization temporal period (e.g., the 4$^{th}$ through the last day of every month), storage management process 10 may make an identical copy of data portion 240 onto higher-performance storage system (e.g., subsystem 200), resulting in the generation of copied portion 244 on (in this example) data array 206. As will be discussed below in greater detail, copied portion 244 may be processed by higher-performance storage system (e.g., subsystem 200) to allow for a higher level of performance during the high-utilization temporal period (e.g., the 1$^{st}$ through the 3$^{rd}$ of every month).

High Utilization Period

When accessing the data portion through the higher-performance storage system (e.g., subsystem 200) during the high-utilization temporal period (e.g., the through the 3$^{rd}$ of every month), storage management process 10 may:

execute 264 read operations on copied portion 244 located on the higher-performance storage system (e.g., subsystem 200);

execute 266 synchronous write operations on copied portion 244 located on the higher-performance storage system (e.g., subsystem 200); and execute 268 asynchronous write operations on data portion 240 located on the lower-performance storage system (e.g., subsystem 202).

Since this is during the high-utilization temporal period (e.g., the 1$^{st}$ through the 3$^{rd}$ of every month), IO requests received concerning data portion 240 should be high. Accordingly, the higher-performance storage system (e.g., subsystem 200) will likely be needed to provide an acceptable level of performance.

Therefore, storage management process 10 may execute 264 read operations (e.g., in response to read request 120) on copied portion 244 located on the higher-performance storage system (e.g., subsystem 200). Specifically, the higher-performance storage system (e.g., subsystem 200) would be better able to timely fulfill the larger number of read requests (for the reasons discussed above) when compared to the lower-performance storage system (e.g., subsystem 202).

Further, storage management process 10 may execute 266 synchronous write operations (e.g., in response to write request 116) on copied portion 244 located on the higher-performance storage system (e.g., subsystem 200). As discussed above, synchronous write operations require that a write acknowledgement be received from a data array prior to an acknowledgement being provided to the device making the write request. Since this concerns the higher-performance storage system (e.g., subsystem 200), subsystem 200 should provide the level of performance necessary to avoid any latency due to the need to wait for data array write acknowledgements.

Additionally, storage management process 10 may execute 268 asynchronous write operations (e.g., in response to write request 116) on data portion 240 located on the lower-performance storage system (e.g., subsystem 202). As discussed above, synchronous write operations require that a write acknowledgement be received from a data array prior to an acknowledgement being provided to the device making the write request; and asynchronous write operations do not have such a requirement. Since this concerns the lower-performance storage system (e.g., subsystem 202), subsystem 202 may not be able to provide the level of performance necessary to avoid latency due to the need to wait for data array write acknowledgements during synchronous write operations. Accordingly and with respect to the lower-performance storage system (e.g., subsystem 202), an asynchronous write procedure may be employed (which requires that a write acknowledgement be received from the data array (in this example, data array 220); but not prior to an acknowledgement being provided to the device making the write request.

Alternatively, the write operations performed (e.g., in response to write request 116) on data portion 240 located on the lower-performance storage system (e.g., subsystem 202) may be done in a block fashion, wherein all of the write operations are done at once when e.g., transitioning from utilizing the higher performance subsystem (e.g., subsystem 200) to the lower performance subsystem (e.g., subsystem 202). For example, write operations to be performed on the lower-performance storage system (e.g., subsystem 202) may be defined within a list of write operations (not shown) to be performed and, upon transitioning from utilizing the higher performance subsystem to the lower performance subsystem, the write operations defined within this list of write operations (not shown) may be processed in a block fashion.

Transitioning from High to Low

When once again accessing data portion 240 through the lower-performance storage system (e.g., subsystem 202) during the low-utilization temporal period (e.g., the 4$^{th}$ through the last day of every month), storage management process 10 may remove 270 copied portion 244 from the higher-performance storage system (e.g., subsystem 200), that is: a) after expiry of the high-utilization temporal period (e.g., the 1$^{st}$ through the 3$^{rd}$ of every month) and b) after completion of the asynchronous write operations executed on data portion 240 located on the lower-performance storage system (e.g., subsystem 202).

Specifically, once the high-utilization temporal period (e.g., the 1$^{st}$ through the 3$^{rd}$ of every month) ends, there is no longer a need for copied portion 244 to be present on the higher-performance storage system (e.g., subsystem 200). Accordingly, storage management process 10 may remove 270 (e.g., delete) copied portion 244 from the higher-performance storage system (e.g., subsystem 200). However, since an asynchronous write procedure was utilized with respect to the lower-performance storage system (e.g., subsystem 202), data portion 240 on the lower-performance storage system (e.g., subsystem 202) will only be identical to copied portion 244 on the higher-performance storage system (e.g., subsystem 200) once the asynchronous write operations have completely executed on data portion 240. Accordingly and once completely executed, storage management process 10 may remove 270 (e.g., delete) copied portion 244 from the higher-performance storage system (e.g., subsystem 200) without any data being lost.

At this point in time, storage management process 10 may resume operation in the "Low Utilization Period", as described above.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method comprising:
identifying, on a computing device, a data portion having temporally-variable utilization;
defining a utilization schedule for the data portion, wherein the utilization schedule defines at least one high-utilization temporal period and at least one low-utilization temporal period based upon, at least in part, when the data portion is scheduled to be utilized;
accessing the data portion through a higher-performance storage system during the high-utilization temporal period; and
accessing the data portion through a lower-performance storage system during the low-utilization temporal period.

2. The computer-implemented method of claim 1 wherein the higher-performance storage system includes one or more solid state disks.

3. The computer-implemented method of claim 1 wherein the lower-performance storage system includes one or more hard disk drives.

4. The computer-implemented method of claim 1 wherein accessing the data portion through a lower-performance storage system during the low-utilization temporal period includes:
executing read operations on the data portion located on the lower-performance storage system; and
executing synchronous write operations on the data portion located on the lower-performance storage system.

5. The computer-implemented method of claim 4 wherein accessing the data portion through a lower-performance storage system during the low-utilization temporal period includes:
copying the data portion from the lower-performance storage system to the higher-performance storage system prior to the high-utilization temporal period, thus defining a copied portion.

6. The computer-implemented method of claim 5 wherein accessing the data portion through a higher-performance storage system during the high-utilization temporal period further includes:
executing read operations on the copied portion located on the higher-performance storage system;
executing synchronous write operations on the copied portion located on the higher-performance storage system; and
executing asynchronous write operations on the data portion located on the lower-performance storage system.

7. The computer-implemented method of claim 6 wherein accessing the data portion through a lower-performance storage system during the low-utilization temporal period further includes:
removing the copied portion from the higher-performance storage system after expiry of the high-utilization temporal period and after completion of the asynchronous write operations executed on the data portion located on the lower-performance storage system.

8. A computer program product residing on a non-transitory computer readable medium having a plurality of instructions stored thereon which, when executed by a processor, cause the processor to perform operations comprising:
identifying a data portion having temporally-variable utilization;
defining a utilization schedule for the data portion, wherein the utilization schedule defines at least one high-utilization temporal period and at least one low-utilization temporal period based upon, at least in part, when the data portion is scheduled to be utilized;
accessing the data portion through a higher-performance storage system during the high-utilization temporal period; and
accessing the data portion through a lower-performance storage system during the low-utilization temporal period.

9. The computer program product of claim 8 wherein the higher-performance storage system includes one or more solid state disks.

10. The computer program product of claim 8 wherein the lower-performance storage system includes one or more hard disk drives.

11. The computer program product of claim 8 wherein accessing the data portion through a lower-performance storage system during the low-utilization temporal period includes:
executing read operations on the data portion located on the lower-performance storage system; and
executing synchronous write operations on the data portion located on the lower-performance storage system.

12. The computer program product of claim 11 wherein accessing the data portion through a lower-performance storage system during the low-utilization temporal period includes:
copying the data portion from the lower-performance storage system to the higher-performance storage system prior to the high-utilization temporal period, thus defining a copied portion.

13. The computer program product of claim 12 wherein accessing the data portion through a higher-performance storage system during the high-utilization temporal period further includes:
executing read operations on the copied portion located on the higher-performance storage system;
executing synchronous write operations on the copied portion located on the higher-performance storage system; and
executing asynchronous write operations on the data portion located on the lower-performance storage system.

14. The computer program product of claim 13 wherein accessing the data portion through a lower-performance storage system during the low-utilization temporal period further includes:
removing the copied portion from the higher-performance storage system after expiry of the high-utilization temporal period and after completion of the asynchronous write operations executed on the data portion located on the lower-performance storage system.

15. A computing system including a processor and memory configured to perform operations comprising:
identifying a data portion having temporally-variable utilization;
defining a utilization schedule for the data portion, wherein the utilization schedule defines at least one high-utilization temporal period and at least one low-utilization temporal period based upon, at least in part, when the data portion is scheduled to be utilized;

accessing the data portion through a higher-performance storage system during the high-utilization temporal period; and accessing the data portion through a lower-performance storage system during the low-utilization temporal period.

16. The computing system of claim 15 wherein the higher-performance storage system includes one or more solid state disks.

17. The computing system of claim 15 wherein the lower-performance storage system includes one or more hard disk drives.

18. The computing system of claim 15 wherein accessing the data portion through a lower-performance storage system during the low-utilization temporal period includes:

executing read operations on the data portion located on the lower-performance storage system; and executing synchronous write operations on the data portion located on the lower-performance storage system.

19. The computing system of claim 18 wherein accessing the data portion through a lower-performance storage system during the low-utilization temporal period includes:

copying the data portion from the lower-performance storage system to the higher-performance storage system prior to the high-utilization temporal period, thus defining a copied portion.

20. The computing system of claim 19 wherein accessing the data portion through a higher-performance storage system during the high-utilization temporal period further includes:

executing read operations on the copied portion located on the higher-performance storage system;

executing synchronous write operations on the copied portion located on the higher-performance storage system; and executing asynchronous write operations on the data portion located on the lower-performance storage system.

21. The computing system of claim 20 wherein accessing the data portion through a lower-performance storage system during the low-utilization temporal period further includes:

removing the copied portion from the higher-performance storage system after expiry of the high-utilization temporal period and after completion of the asynchronous write operations executed on the data portion located on the lower-performance storage system.

* * * * *